UNITED STATES PATENT OFFICE.

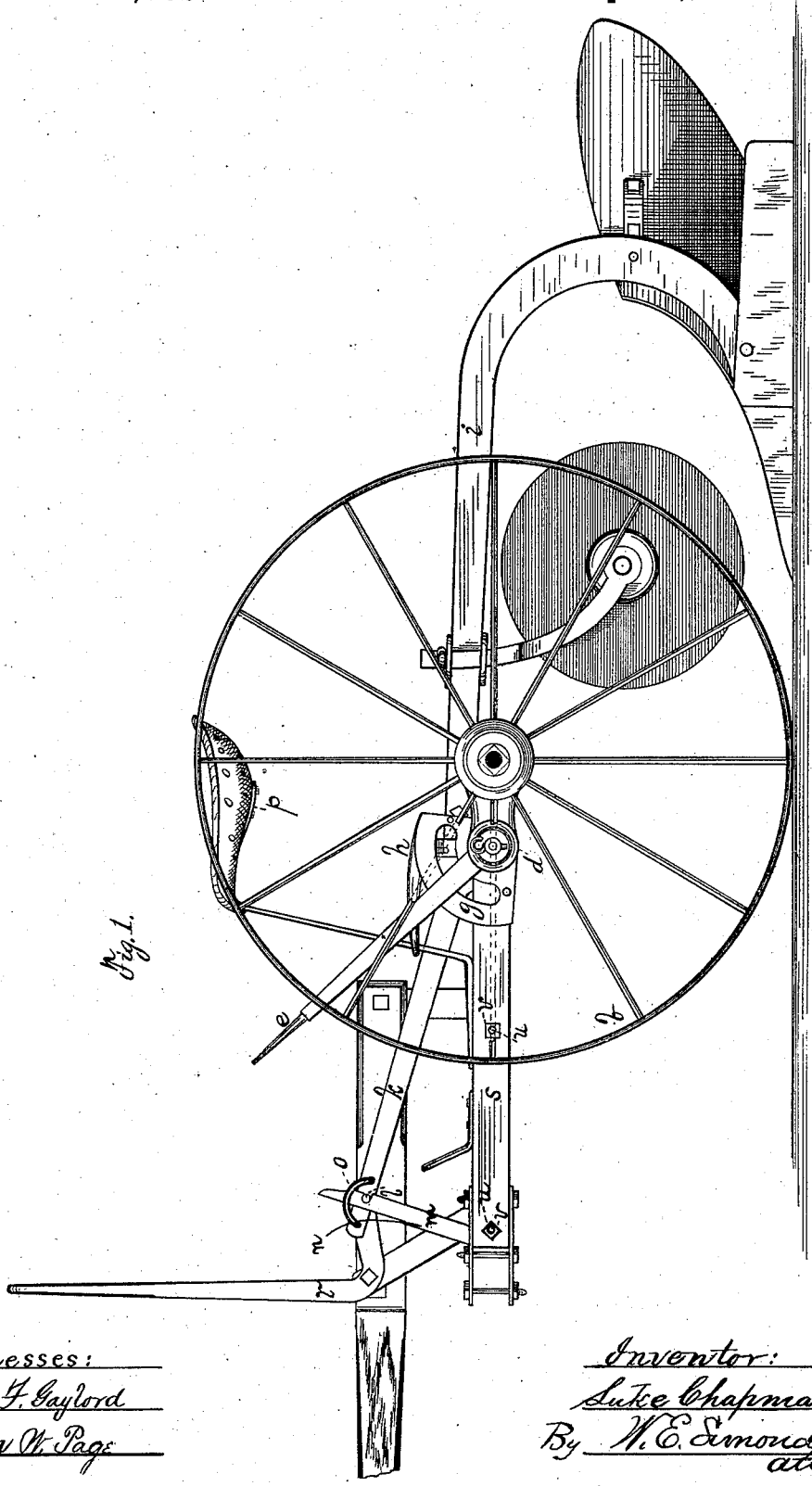

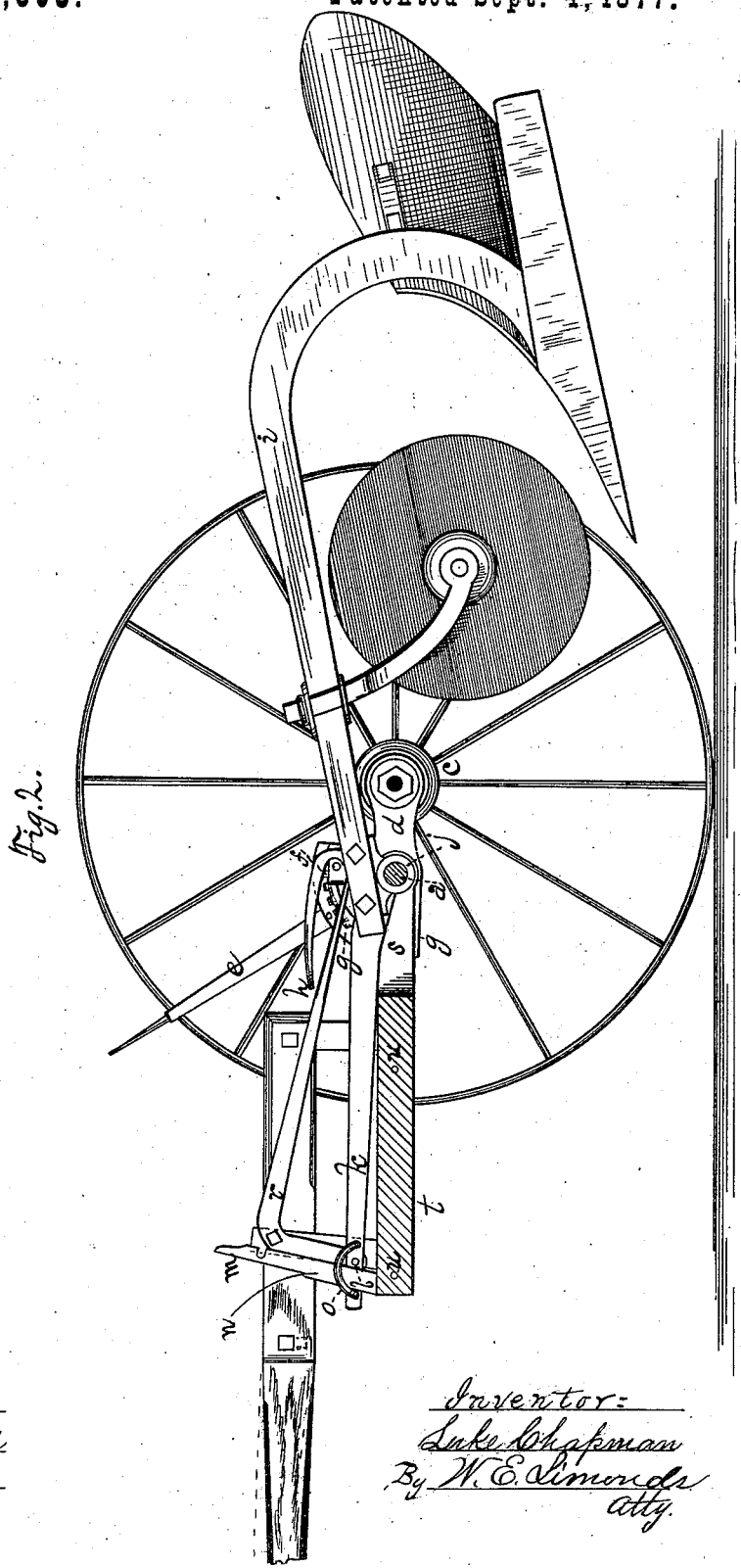

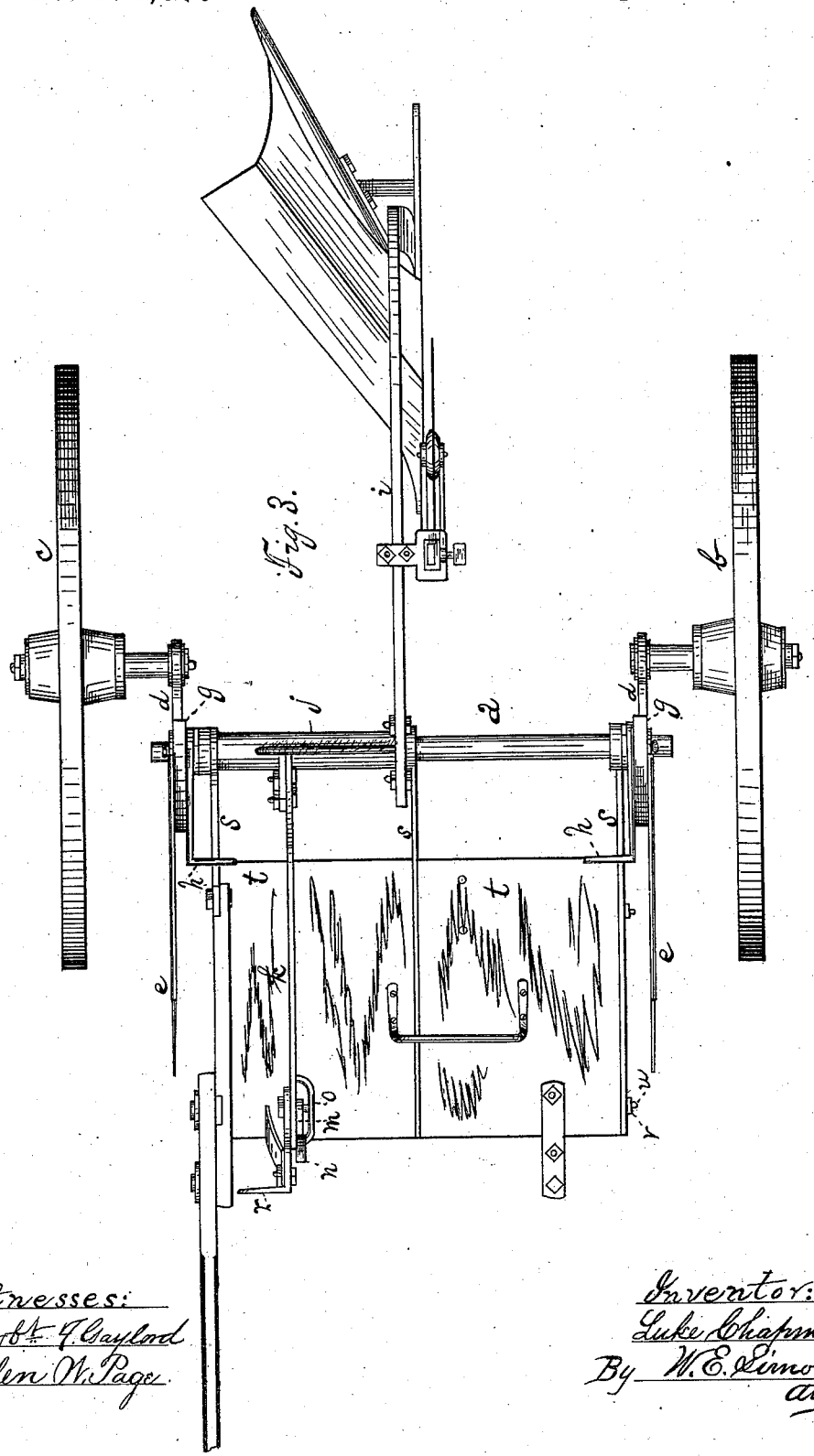

LUKE CHAPMAN, OF COLLINSVILLE, CONNECTICUT, ASSIGNOR OF ONE-HALF HIS RIGHT TO THE COLLINS COMPANY, OF SAME PLACE.

IMPROVEMENT IN WHEEL-PLOWS.

Specification forming part of Letters Patent No. 194,803, dated September 4, 1877; application filed December 23, 1876.

*To all whom it may concern:*

Be it known that I, LUKE CHAPMAN, of Collinsville, in the county of Hartford and State of Connecticut, have invented certain new and useful Improvements pertaining to Wheel-Plows; and that the following is a full description thereof, reference being had to the accompanying drawings, wherein—

Figure 1 is a side view with the plow down. Fig. 2 is a sectional elevation with the plow up. Fig. 3 is a top view with the parts in the same position as in Fig. 1, and the seat removed.

The letter $a$ denotes the main axle; $b$, the land-wheel—that is, the wheel which runs on the yet unplowed land; and $c$, the furrow-wheel—that is, the wheel which runs in the furrow.

My plow, as shown in the accompanying drawings, has certain adjustments not produced by mechanism claimed herein, to wit:

First, adjustment for transportation, both wheels running on the same level, and the plow raised somewhat from the ground.

Second, adjustment for taking the first furrow, both wheels running on the same level, and the plow running below the level of the wheels.

Third, adjustment for regular plowing, the furrow-wheel and plow both running below the level of the land-wheel.

These adjustments are produced by having the wheels hung on crank-arms $d\ d$, which have partial rotation on the main axle, the adjustment thereof being governed by the levers $e\ e$. The wheels are locked in adjustment by spring-pawls $f f$, (but one of these pawls is shown in the drawings, and that in Fig. 2, both are, however, alike,) taking into toothed quadrants $g\ g$, and released from contact, when required, by the driver's foot placed upon levers $h\ h$.

These parts just described are covered and claimed in prior patents of mine. It is, however, desirable, if not necessary, to describe such parts, and such adjustments herein, that the office and purpose of the further adjusting apparatus that I show and claim herein may be apparent.

It is desirable, in addition to the adjustments just described, that the driver of the plow should be able, by some movement of little complexity, to raise and lower the plow when turning the machine around at the end of a furrow, or on meeting some stone, stump, or other obstruction.

I will now describe means for accomplishing this end: The plow-beam $i$ is fast to and rigid upon the sleeve $j$, which is loose on the main axle. From this sleeve, and rigid with it, extends the lever $k$, intended to be operated by the foot of the driver, by the raising and lowering of which lever the plow is lowered and raised. On the side of this lever is a pin, $l$, operating, in connection with the notch in hinged pawl $m$, to hold the plow down. The pawl is pressed to engagement with the pin by the spring $n$ bearing against the inner side of one end of the loop $o$, borne on the side of the foot-lever, and encircling the pawl and the spring.

The pawl is so situated with reference to the foot-lever that at the same time the driver bears with his heel on the top of the foot-lever he can bear with the toes or fore end of the foot against the pawl, and unlock it from the foot-lever, thus accomplishing the unlocking and the depression of the foot-lever—and consequent raising of the plow—by what is practically one motion of the foot, the driver, meanwhile, being seated in the seat $p$.

For very heavy plows, or where more than one plow is used, I make use of the pivoted bell-crank hand-lever $r$, in the use of which the driver can assist the action of the foot-lever with his hand.

I have also to describe a new, simple, and strong means for attaching the foot-board to the main axle. The flat metallic arms $s\ s$ at the rear embrace and are rigid with the main axle. They pass along the sides of the foot-board $t$, and are secured thereto by bolts $u$ and nuts $v$. These bolts not only serve the purpose of fastening the arms and the foot-board together, but, passing, as they do, through the whole width of the foot-board, they add immensely to its strength, and enable it to bear the rough jars and hard strains to which it is exposed.

With reference to the first clause of the claim hereinafter made, I would say that I by no means intend to claim all means of pivoting the plow-beam and foot-lever upon the main axle; but only the use of a sleeve inclosing and rotating upon the main axle itself, such use of a sleeve, in the combination claimed, being new, cheap, useful, and strong.

I do not mean to be understood that the parts herein claimed cannot be used except in connection with the other adjusting mechanism herein shown but not claimed, for they can, and, when used in wheel-plows, I understand them to be embraced within my invention and these Letters Patent.

I claim as my invention—

1. In a wheel-plow, the combination of the plow-beam $i$, sleeve $j$, embracing and rotating on the main axle $a$, and the lever $k$, adapted to be operated by the driver's foot, all arranged as described.

2. In combination, the plow-beam $i$ and lever $k$, pivoted on axle $a$, and the pawl $m$, located with reference to the foot-lever, so that both lever and pawl may be operated by the driver's foot, substantially as shown and described.

3. In a wheel-plow, the combination of the foot-lever $k$ and the pivoted hand-lever $r$, also jointed to the foot-lever, for raising and lowering the plow, substantially as shown and described.

LUKE CHAPMAN.

Witnesses:
WM. E. SIMONDS,
OLIVER F. PERRY.